United States Patent
Laakso et al.

(10) Patent No.: US 6,456,605 B1
(45) Date of Patent: Sep. 24, 2002

(54) METHOD AND A SYSTEM FOR OPTIMAL UTILIZATION OF THE DATA COMMUNICATION CAPACITY IN A CELLULAR RADIO SYSTEM

(75) Inventors: Janne Laakso, Helsinki; Tatu Koljonen; Mika Rinne, both of Espoo; Oscar Salonaho, Helsinki, all of (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/188,933

(22) Filed: Nov. 10, 1998

(30) Foreign Application Priority Data

Nov. 14, 1997 (FI) .................................................. 974240

(51) Int. Cl.$^7$ .......................... H04Q 7/00; H04B 7/212
(52) U.S. Cl. ...................................... 370/330; 370/337
(58) Field of Search .................................. 370/310, 318, 370/314, 330, 333, 335, 319–321, 347, 368, 328, 465, 468, 477, 278, 277, 282, 343, 337, 332; 455/507, 509, 517, 522, 524, 503, 13.4, 63, 226.3

(56) References Cited

U.S. PATENT DOCUMENTS 5,551,057 A * 8/1996 Mitra ........................ 455/33.1
5,594,946 A * 1/1997 Menich et al. .............. 455/54.1
5,757,789 A * 5/1998 Dent ........................... 370/337
6,002,942 A * 12/1999 Park ........................... 455/522
6,289,003 B1 * 9/2001 Raitola et al. ............... 370/278

* cited by examiner

*Primary Examiner*—Alpus H. Hsu
*Assistant Examiner*—Duc Ho
(74) *Attorney, Agent, or Firm*—Perman & Green, LLP

(57) ABSTRACT

The discussion concerns the mutual arrangement of packets to be transmitted in a radio system, where the transmitted data is formed into packets (204, 205, 206) for the transmission. The system comprises at least two transmitting devices which transmit substantially simultaneously and substantially on the same frequency, whereby the carrier power transmitted by the first transmitting device is interference power to those receiving devices, to which the second device transmits carrier power, and vice versa. In order to arrange the packets there is generated a utility function with a value, which depends on the carrier power and the interference power and which can be obtained by calculation for the transmitted packets in their mutual transmitting order at that moment. The packets to be transmitted are arranged in a mutual transmission order corresponding to the extreme value of the utility function.

21 Claims, 10 Drawing Sheets

METHOD AND A SYSTEM FOR OPTIMAL UTILIZATION OF THE DATA COMMUNICATION CAPACITY IN A CELLULAR RADIO SYSTEM

TECHNOLOGICAL FIELD

The invention relates generally to the realisation of the radio interface in a cellular radio system between the base stations and the terminals. Particularly the invention relates to the arrangement of the transmitted data and to the determination of the transmission power, so that the available data communication capacity can be maximally utilised. The data communication capacity is formed by time and frequency band.

BACKGROUND OF THE INVENTION

In cellular systems it is common that the radio communication between the base stations and the terminals comprises cyclically repeating frames which are divided into smaller parts, which can be called slots. A frame represents a certain period, during which a certain frequency band is divided to be used by certain connections with the aid of a multiple access method. Common multiple access methods are TDMA (Time Division Multiple Access), CDMA (Code Division Multiple Access) and FDMA (Frequency Division Multiple Access). In TDMA the slots in the frames are time slots, whereby one frame can contain for instance eight slots, of which each can be allocated to be used by a certain radio connection. In some systems the size and number of the time slots in a frame can vary from one frame to another. In CDMA the slots represent mutually orthogonal or almost orthogonal spreading codes, which during at least on frame can be assigned to a certain radio connection. In FDMA the slots are narrower parts of the utilised frequency bandwidth. There has also been proposed combinations of FDMA, CDMA and TDMA where the frame is divided into time slots, which further can be divided into smaller parts, based on either time, frequency or code.

During a slot allocated to a radio connection it will experience interference or disturbances, which are caused by other radio connections within the area of the same cell or of an adjacent cell. The amount and quality of the interference depends on the number of simultaneous radio connections and on the multiple access method and reuse factor, which describes how close to a certain cell there is another cell using the same radio frequencies or the same spreading codes. In CDMA the interference of the own cell can form an essential part of the whole interference, but in TDMA and FDMA the larger part of the interference comes from other cells.

The radio connections must achieve a certain correctness so that they can transmit data in a desired manner. This can be achieved at a sufficient C/I ratio (Carrier to Interference Ratio), which represents the ratio of the carrier power and the simultaneously received interference power. For prior art cellular radio systems it is typical that the C/I ratio (or the SIR—Signal to Interference Ratio—or the S/N—Signal to Noise ratio—or the S/(I+N)—Signal to Interference plus Noise ratio—or another corresponding factor) has been defined with a target level, and for each radio connection the transmit power is controlled to be so high that the target level is barely reached. It is not worth to have a higher transmit power than required to achieve the target level of the C/I ratio, because an unnecessary high transmit power consumes electrical energy in the transmitting device and causes interference in other simultaneous radio connections.

The prior art method is not very efficient regarding the optimisation of the radio interface utilisation. If two adjacent base stations in the TDMA system simultaneously initiate a radio connection when these base stations use the same frequency in their cells, then these connections can be involved in a competition situation: both connections alternately increase their transmit powers in order to raise the C/I ratio to the target level, whereby each power increase in the first cell increases the interference in the other cell, and the actions go on in a circle. A similar competition situation may occur in one base station or in two adjacent base stations of the CDMA system between two simultaneous radio connections using different spreading codes.

The Finnish patent application no. 964308 and the corresponding U.S. patent application with the Ser. No. 08/802, 645 present a method for sharing radio resources, where one possibility is to co-ordinate the slot reservation situation between adjacent base stations. The application expresses in general terms that when the slots are reserved it is considered whether the connection requires real time data communication or non-real time data communication, or how high transmit power the connection must use due to the distance between the terminal and the base station.

SUMMARY OF THE INVENTION

The object of the present invention is a method and a system, with which the data transmission capacity at the radio interface of a cellular radio system can be maximally utilised.

The objects of the invention are attained by considering a combination of all frame structures used by simultaneous radio connections and by dividing the packets relating to the connections into slots of considered frames and/or by selecting the transmit powers of the packets so that the utility function calculated from the considered connections is maximised.

The method according to the invention is according to the first embodiment of the invention characterised in that in the method
  a first utility function is generated having a value which depends on the carrier power and the interference power that can be obtained by calculation for the transmitted packets in their mutual transmitting order at that moment,
  the packets to be transmitted are arranged in a mutual transmission order corresponding to the extreme value of said first utility function.

The method according to the invention is according to the a second embodiment of the invention characterised in that in the method
  a second utility function is generated, whereby the value of this utility function depends on the carrier power and the interference power which can be obtained by calculation for the packets to be transmitted in their mutual transmitting order at that moment, and
  transmit powers are selected for the packets to be transmitted so that the transmit powers together correspond to an extreme value of said second utility function.

The invention relates also to a radio system, which according to the first embodiment of the invention is characterised in that it comprises means
  for calculating the value of such a first utility function, the value of which function depends on the carrier power and the interference power obtainable by calculation for the transmitted packets in their current mutual transmission order at that moment, for giving instructions to the transmitting devices to arrange the packets in such a mutual transmission order which corresponds to the extreme value of said first utility function, and for giving instructions to the receiving devices to receive the packets in such an order, in which the transmitting devices arrange the packets to be transmitted.

The radio system according to the invention is according to a second embodiment of the invention characterised in that it comprises means for calculating the value of such a second utility function, the value of which function depends on the carrier power and the interference power obtainable by calculation for the simultaneously transmitted packets, and for giving instructions to the transmitting devices to select such transmit powers for the packets, which powers correspond to the extreme value of said second utility function.

In order to be able to treat as an entity the effects on different connections caused by the slot allocation and the transmit power selection, a sufficiently large part of the radio interface must be considered at the same time. In this patent application the set of frames examined at the same time is called a radio resource knapsack. In principle the invention does not limit the size of the radio resource knapsack, but in order to have a meaningful application of the invention the radio resource knapsack must contain such frames or corresponding units which are transmitted substantially simultaneously and in which parts (slots) can be allocated to different radio connections, so that it is possible to act centrally on the allocations. The maximum size of the radio resource knapsack depends on the number of simultaneously transmitted frames used in the area where the radio connections contained in the frames can cause mutual interference, and on how effective calculation capacity is available for performing the optimisation according to the invention. The size of the radio resource knapsack is further limited by the requirements on signalling in the base station network, as the signalling requirements are proportional to the size: a centrally controlled allocation of the slots in the frames transmitted via different base stations require signalling between the base stations and the device centrally controlling the allocation of slots.

The size of the radio resource knapsack is not necessarily determined as a fixed size, but it can change dynamically. For instance, the system can monitor which part of the system has the highest load, and then form groups of base stations in the area of the currently highest load, whereby the optimisation of the frame allocation is made by the method according to the invention. Then the simultaneously transmitted frames in the group form one radio resource knapsack. The determination of the radio resource knapsack on the basis of the load or any other variable factor can be called adaptive optimisation of the radio resources.

The invention is suited for application in different radio systems, regardless of whether they utilise circuit switched or packet switched connections. However, because the invention relates to the allocation of slots and the selection of the transmit power for the data amount contained in the slot, this requires that the data transmitted by the connections can be divided into parts with the size of one slot (the slots contained in a frame can be of different sizes). In this patent application the information part transmitted in one slot is for short called a packet, regardless of whether it refers to a circuit switched or a packet switched connection. In the transmitting base station acting as the transmitting device a certain number of packets to be transmitted are stored in a certain transmission buffer. In the same way the packets to be transmitted in the up-link direction from the terminals can be thought as of being in a transmission buffer according to their transmission order. The packets can have some mutual order of importance which is represented by the importance value related to each packet: the higher the value the more important the packet is. Further it is assumed that the cellular radio system in question utilises a retransmission protocol of the ARQ type (Automatic Repeat reQuest), according to which the receiving device can ask retransmission of a received packet which contained errors. For modem ARQ practices it is typical that the receiving device uses all (even the erroneously) received versions when it tries to reconstruct the contents of a transmitted packet, whereby it in fact is not necessary to receive a correct packet even once. All retransmissions increase the probability that the receiving device can correctly reconstruct the contents of the packet.

When one knows the used transmit power for each radio connection and the attenuation of the signal between the transmitter and the receiver related to each radio connection are known, then it is possible to calculate which C/I ratio this will provide in each radio connection concerning each presented slot reservation model or radio resource knapsack packing alternative. For a considered packet i transmitted in a certain slot the value $(C/I)_i$ of the C/I ratio representing the packet is obtained for the TDMA system by the equation $$(C/I)_i = \frac{P_i G_{ii}}{\sum_{\substack{j=1 \\ j \neq i}}^{No\_BS} P_j G_{ij}} \quad (1)$$

where $P_i$ represents the transmit power used to transmit the considered i:th packet, $G_{ii}$ represents the distance attenuation between the transmitter of the i:th packet and the intended receiver, $P_j$ represents the transmit power used to transmit simultaneously the j:th packet, and $G_{ij}$ represents the distance attenuation between the transmitter of the j:th packet and the intended receiver of the i:th packet. The factor $No\_BS$ limiting the summing is the number of those devices, which transmit simultaneously with the transmission of the considered packet. In the CDMA system the corresponding equation is obtained by taking into account the packets transmitted in the same cell at the same time as a certain packet as well as the packets transmitted simultaneously in other cells, as well as the (imperfect) orthogonality of the spreading codes and the processing gain in the receiving device.

According to the first embodiment of the invention the radio resource knapsack is packed, or the packets to be transmitted are placed in the slots contained in the frames, so that the so called utility function calculated over the entire radio resource knapsack is maximised, whereby the utility function depends on C/I ratios or on corresponding values representing the ratio between the signal and the interference which can be obtained by calculation. The relative significance of the C/I ratios of certain packets can be emphasised by considering, in addition to the C/I ratio, also the above mentioned importance value related to a packet. According to another embodiment of the invention the packets which have been selected to be transmitted simultaneously are selected such transmit powers that the so called second utility function is maximised, whereby this second utility function is calculated over the simultaneous packets and depends on the C/I ratios obtainable by calculation, or on corresponding values representing the ratios between the signals and the interference. The relative importance of the C/I ratios of certain packets can also here be emphasised by taking into account the above mentioned importance value relating to a packet, in addition to the C/I ratio. Thus the packing of the radio resource knapsack and the selection of the transmit powers results in a multi-variable optimisation problem, where the variables are the location of the packets in the slots of the frames and the transmit power used to transmit them. The invention does not impose limits on the definition of the utility function, if only it will depend on the C/I ratio of the connections or on another quantity representing the amount and/or quality of the signal and on the other hand of the noise or interference.

BRIEF DESCRIPTION OF THE DRAWINGS

The invention is described in more detail below with reference to the preferred embodiments presented as examples, and to the enclosed figures, in which.

The same reference numerals are used for corresponding parts in the figures.

DETAILED DESCRIPTION OF THE INVENTION

Figure 1:
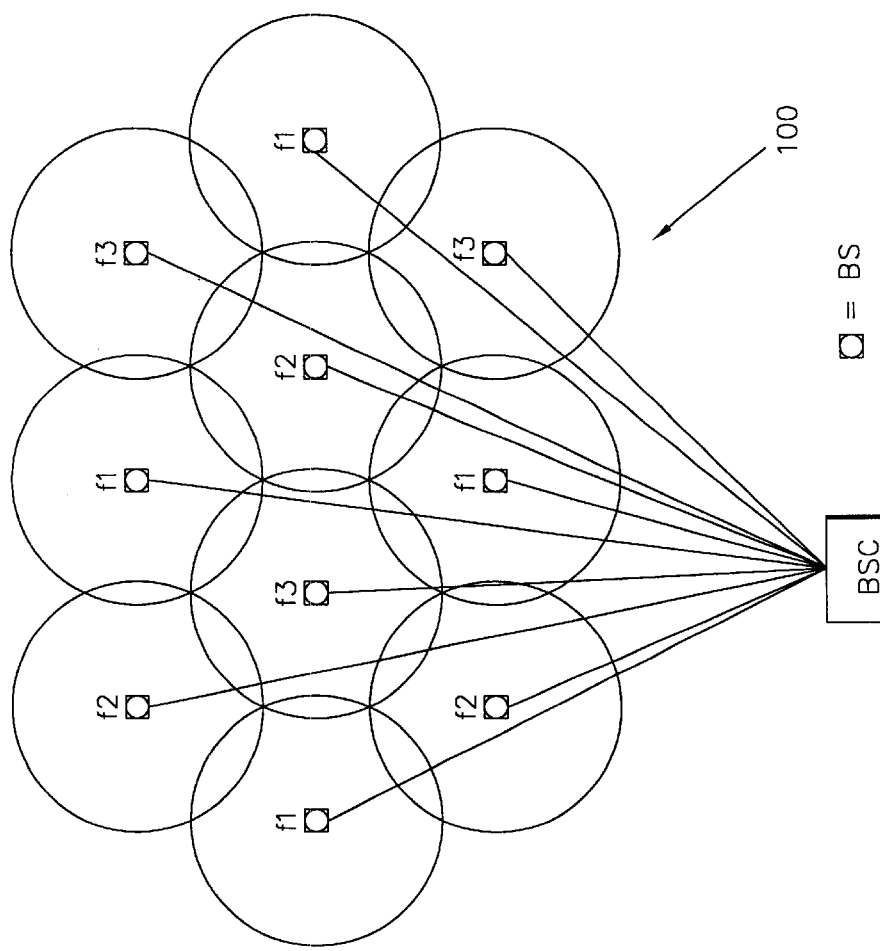
FIG. 1 shows a part of a cellular radio system where the invention can be applied.

FIG. 1 shows a part of a cellular radio system 100, which comprises ten base stations (BS) and a base station controller (BSC) 101 communicating with them. The cells of the base stations are presented in the figure in a circular form and they are partially overlapping. Three frequencies f1, f2 and f3 are used in the part 100 of the cellular radio system, whereby the reuse factor is 3. In each cell both up-link and down-link radio traffic is divided into frames, which for the sake of clarity are not shown in the figure. One or more slots in each frame can be assigned to be used by a certain radio connection. Further it is assumed that the base stations can operate in a sufficient mutual synchronisation, whereby a new frame is started simultaneously in each cell. When the synchronisation is missing the receiving device can determine by measurements how large the synchronisation differences are. The assumptions are not necessary for the invention, but they facilitate the understanding of a simple embodiment of the invention.

In the part of the cellular radio system according to FIG. 1 the optimisation of the radio resources means the manner in which the packets relating to current radio connections in the cells are placed in the slots of the simultaneous frames used in the respective cells so that the best possible utilisations of the communication and radio resources are obtained in the whole system. The optimisation further includes control of the transmit power of each packet. In some cases it can also include a decision about through which base station a certain connection is routed, if several possible base stations are available (the terminal is for instance simultaneously within a certain macro cell and within a micro cell or pico cell in the area of the macro cell). For the hierarchical cell system (HCS) of the UMTS cellular radio system (Universal Mobile Telecommunication System) in development it is very typical that several base stations are simultaneously available to a terminal, both on the same hierarchical level and on different hierarchical levels. The utility of the communication is measured with the so called throughput value, which represents the achieved amount of transmitted information per unit of time. It can further be weighted in different ways, for instance by packet importance values. In a practical embodiment a maximum of the throughput value can for instance be obtained by maximising a certain function dependent on the values of the C/I ratios for a certain radio resource knapsack.

In future micro cell networks a very large share ( 30 to 45%) of the terminals will be able to communicate almost as well with at least two base stations, whereby the selection of frames belonging to the radio resource knapsack and the switching of calls from one base station to another (so called handover) have a strong influence on the system capacity, on the balance of the traffic load, on the stability of cell operation, and on the required signalling between the base stations. If the traffic load temporarily rises in a certain region, it is advisable to be able to switch the calls from terminals at the borders of the region to other base stations touching the loaded region. The terminals can identify these base stations by measuring the signal strengths they receive from different base stations. The same measurements can be used when the value of the interference power is determined for each terminal, which value is used in the calculation of the C/I ratio for each terminal. If the terminal positions would be known in the form of co-ordinates, and not only as the distance to a base station, then the base station could use the position data to calculate the physical distances from a terminal to each base station in the neighbourhood, whereby it would be possible to estimate very accurately how strongly a terminal perceives the interfering power transmitted by each base station. In the same manner it would be possible to determine the physical position with respect to other terminals with the aid of the terminals' position co-ordinates, and on that basis it would further be possible to calculate how high interference power the terminals cause to each others transmissions when the transmit simultaneously.

With the aid of directional antennas it is possible to divide the cell of a certain base station into sectors, each of which can use own transmission frames. Regarding the invention the simultaneous frames of the sectors can be compared with the simultaneous frames of different cells. The frames of all different sectors of the same cell can belong to the same radio resource knapsack, but this is not necessary. The division into sectors provide a benefit in that the position of a terminal in a certain sector will be known more exactly than the location of a terminal in a cell not divided into sectors. When a packet to be transmitted to the terminal X shall be placed into the radio resource knapsack, and it is known that the terminal X is in such a sector of the cell A which points towards cell B from the base station of cell A and away from the cell C on the opposite side of cell A, then it is obvious that when the packet to be transmitted to the terminal X shall be placed the interference caused by the simultaneous packet in the frame of the cell B must be observed more closely than the contents of the frame of the cell C.

Figure 2:
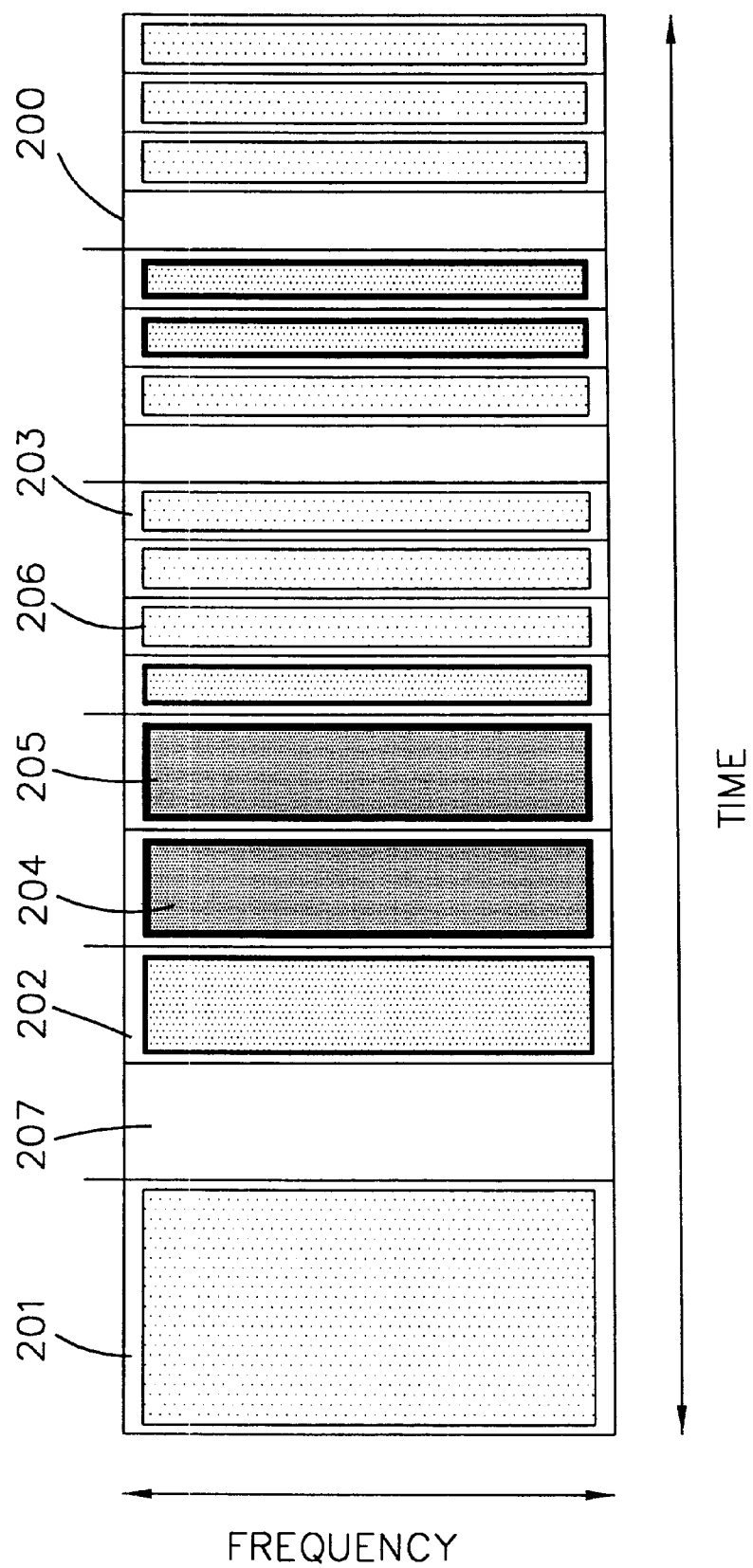
FIG. 2 shows a frame used at the radio interface.

FIG. 2 shows an exemplary frame 200 divided into slots in the direction of the time, whereby packets (for instance the packets 204, 205, 206) are placed into the slots (for instance the slots 202, 202 and 203) of the frame. In the figure it is assumed that one frame can be divided in the direction of the time into six time slots, which further can be divided into slots in three ways, whereby one time slot can take one slot 201 of the largest size category, two slots 202 of the medium size category, or four slots 203 of the smallest size category. Other divisions are possible: the frame can for instance contain eight time slots, and one time slot can contain one slot of the largest size category (a so called 1/8 slot), four slots of the medium size category (so called 1/16 slots), or eight slots of the smallest size category (so called 1/64 slots). In addition to the division into slots in the direction of the time or instead of it, a frame can be divided also in the direction of the frequency, or spreading codes can be used as the basis of the division, whereby in the last mentioned case the slots are superimposed with each other in the direction of the time and in the direction of the frequency.

In FIG. 2 it is further assumed that the packet 204 represents the highest importance value and that the packet 206 represents the lowest importance value, which in the figure is illustrated by the width of the border line. Some of the slots can be empty, such as slot 207. The importance value of a packet can be determined in many ways. In the simplest case all packets are of equal value, whereby the optimisation of the radio resources means direct maximisation of the throughput at the radio interface. The packet importance value is affected for instance by the required quality of service (QoS), the priority of the connection at the system level (for instance an emergency call), the bearer type, the bearer class, or the pricing of the cost-per-bit type in that bearer to which the packet belongs. A bearer means the entity formed by all such factors which have an effect on the communication between a base station and a certain terminal. To the bearer concept is connected i.a. the data communication rate, delay, bit error rate, and the variations of these between certain minimum and maximum values. A bearer could be perceived as a communication bus created by the common effect of these factors, whereby this bus connects a base station and a certain terminal, and whereby payload information can be transmitted through this bus. One bearer always connects only one terminal to one base station. Multifunction terminals can simultaneously maintain several bearers which connect the terminal to one base station. If the system can use macro diversity combining, then the bearer or the bearers can connect the terminal to the network simultaneously via more than one base station. Below the macro diversity combining is described in more detail for the application of the present invention.

The packet importance values between bearers of like values can be determined according to the FIFO principle (First In-First Out), whereby the packet with the longest waiting time has the highest importance value. In systems applying the ARQ practice a packet is removed from the transmission buffer only when the receiving device has acknowledged that it received it correctly (or after a certain time limit, whereby the packet in question is lost). If the importance value of a packet becomes the higher the longer it has stayed in the transmission buffer, then the optimisation algorithm for the packing of the radio resource knapsack tends to place the packets, which stayed longer in the buffer and were transmitted unsuccessfully at least once, in a more favourable slot concerning the C/I ratio, whereby the probability that they reach their destination increases. The packet values can also be determined on the basis on the radio connection quality or the loading of the base station, because it is known that terminals located in different locations of the cell and moving with different speeds will cause different loads on the radio resources available to the cell.

The mechanisms, with which the decision relating to the allocation of a certain slot for a certain packet is made and signalled to the base stations and the terminals, will make is possible that a certain connection does not need to have a permanently allocated place in a frame, but the packets belonging to said connection change places from one slot of the frame to another, even at intervals of a single frame. In certain cases it is, however, advantageous to assign a certain slot within the frames to a connection for a longer time, or even during the whole connection. For instance, the signalling load will be substantially reduced in real time connections continuously transmitting data at a fixed rate, when the same slot is assigned at least during the interleaving period or even during the whole connection.

Figure 3A:
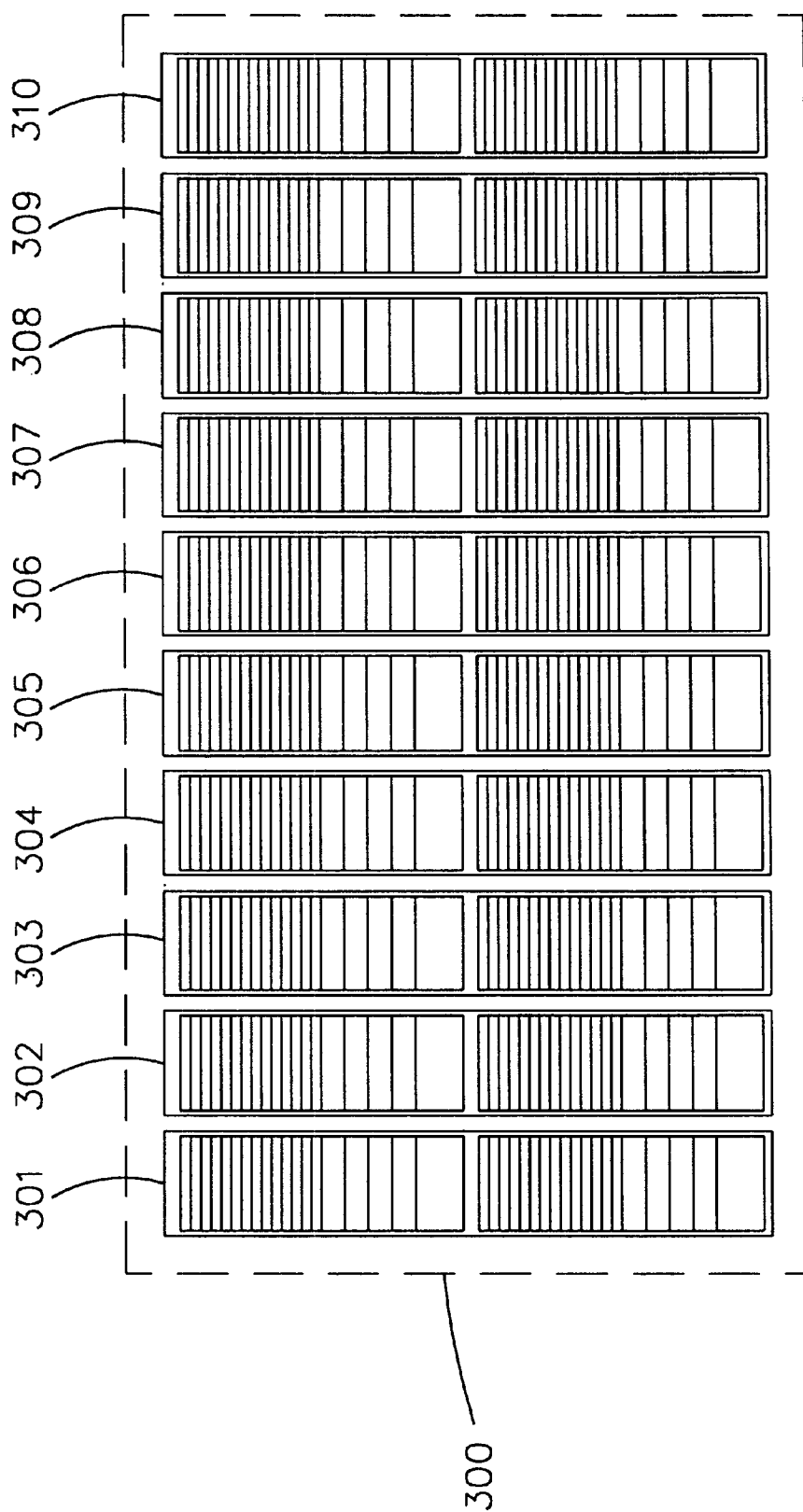
FIGS. 3a to 3c show different radio resource knapsacks.
Figure 3B:
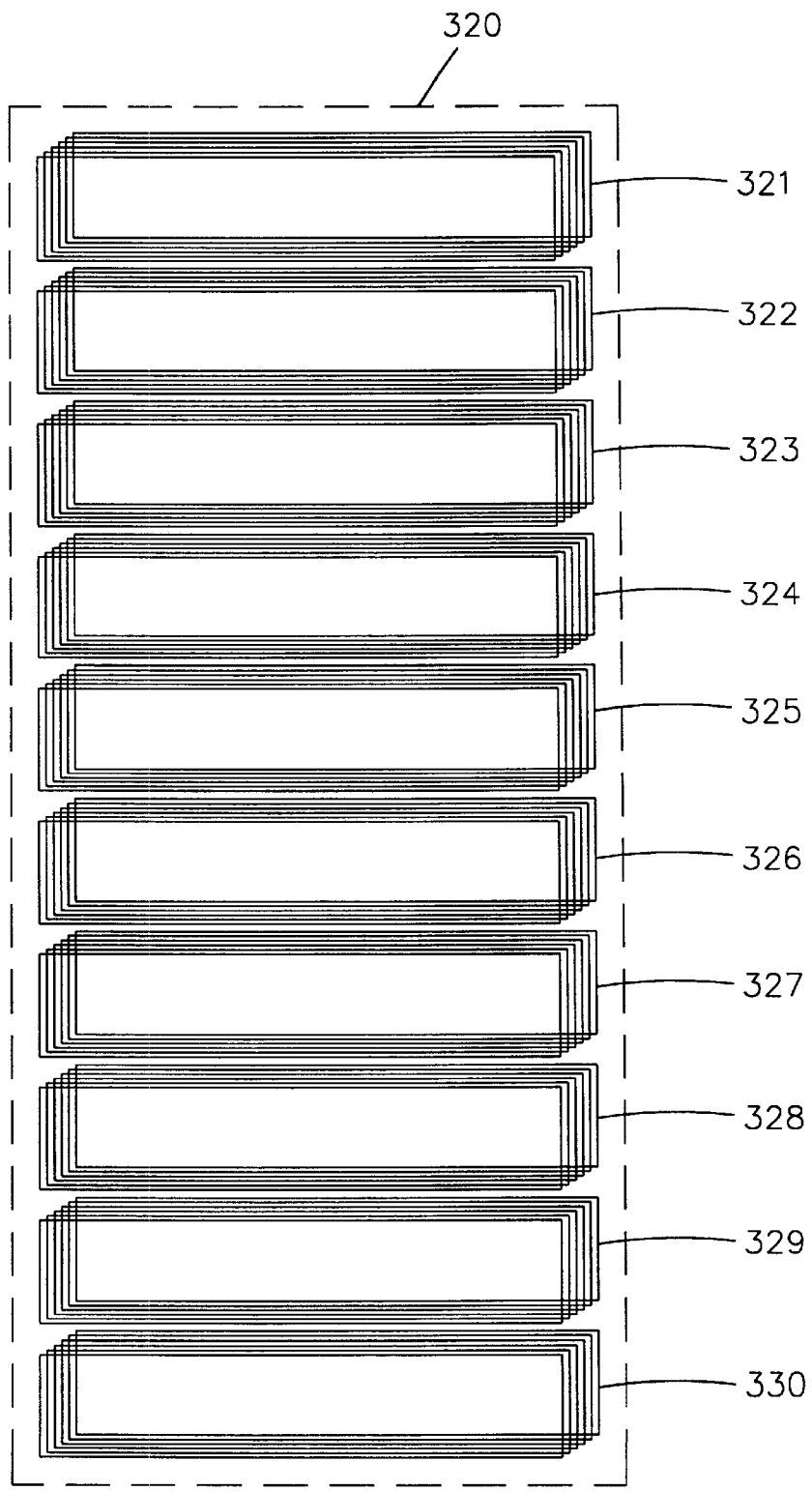
Figure 3C:
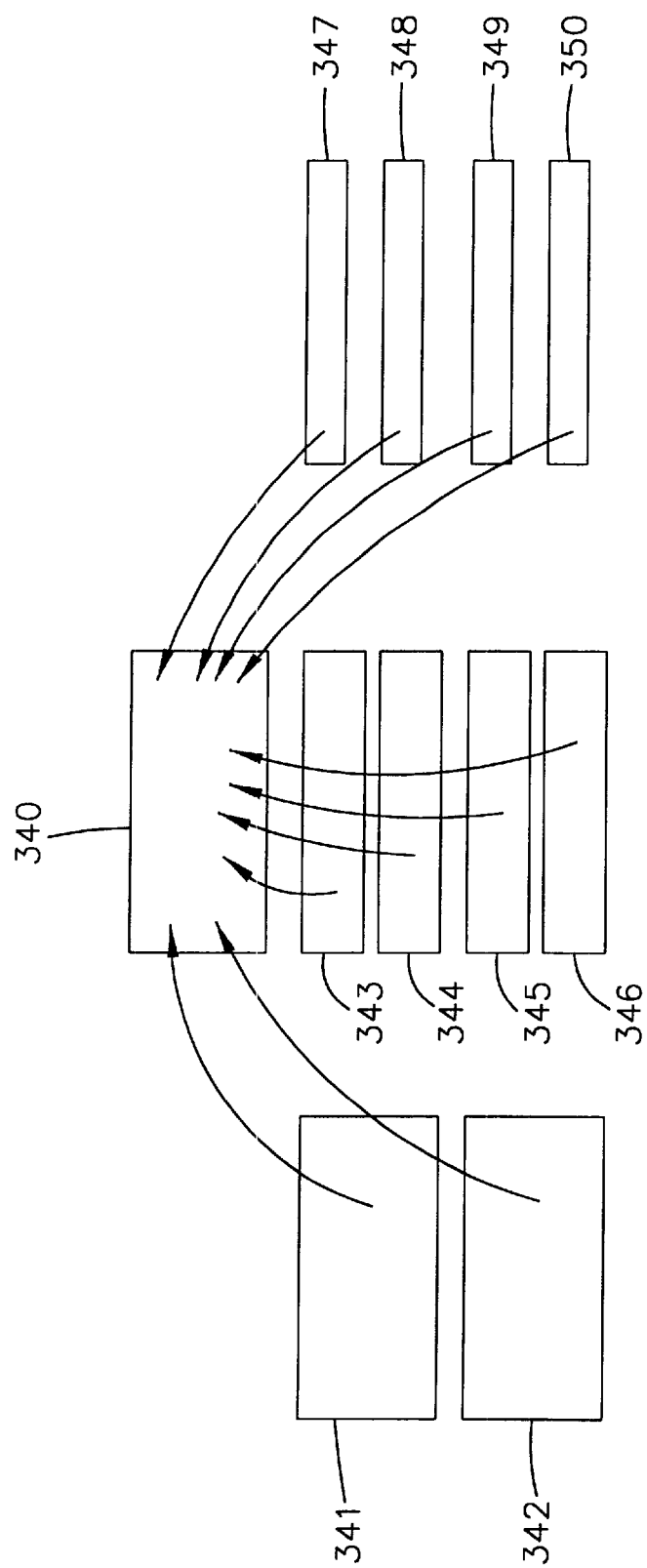

FIG. 3a shows a radio resource knapsack 300 suitable to be used in the TDMA cellular radio system part shown in FIG. 1, whereby the radio resource knapsack includes a pair 301 to 310 formed by two consecutive frames from each of ten base stations. The task of the base station controller 101 shown in FIG. 1, or of some other device optimising the utilisation of the resources, is to place the packets to be transmitted from each base station into the slots of the frames of the corresponding base station in a manner that is as advantageous as possible. In the figure it is assumed that the slot division of the frames is the same in each cell, which is not necessary regarding the invention. FIG. 3b shows a radio resource knapsack 320 which is suited to be used in a CDMA cellular radio system, whereby the radio resource knapsack includes one frame 321 to 330 from each of the ten base stations, whereby each frame is divided into slots by using almost orthogonal spreading codes, whereby the slots are superimposed with other in the direction of the time and in the direction of the frequency (for the sake of clarity the slots are shown only partly on top of each other in the figure). FIG. 3c shows another radio resource knapsack 340, which is suitable to be used in the CDMA system, which concerns only one base station and which contains all those slots 341 to 350, in which said base station can simultaneously transmit packets. The different widths of the slots 341 to 350 mean that the simultaneous CDMA slots can represent different data communication capacities, depending on the spreading ratio of the spreading code used in them.

According to the invention there is formed a utility function, which depends on the C/I ratios which can be obtained in the slots of the frames. The utility function can be defined generally using two levels. First we define a function f, whose value depends on the C/I ratio $[C/I]_{i,j,k}$ obtained in the i:th slot of the j:th frame of the k:th base station:

$$f=f([C/I]_{i,j,k}) \qquad (2)$$

In its simplest form the function f equals its argument, or $f([C/I]_{i,j,k})=[C/I]_{i,j,k}$, where further so called top and bottom cutters can be used, or values of the C/I ratio which exceeds a certain limit are replaced by the top limit value, and values of the C/I ratio which are lower than a certain limit are replaced by the bottom limit value or by zero. More complex forms of the function f can be found empirically.

Then the actual utility function g is determined so that its arguments are the values of the function f in all slots belonging to the radio resource knapsack. Then the values of the function f can be weighted with the importance value $a_{i,j,k}$ of the packets to be placed in each slot. One useful utility function g is the sum of all values of the function f, where each value of the function f has been weighted with a corresponding importance value a:

$$g = \sum_{i,j,k} a_{i,j,k} f([C/I]_{i,j,k}) \quad (3)$$

Another useful utility function g' is the product of all values of the function f, where each value of the function f has been weighted with a corresponding importance value a:

$$g' = \prod_{i,j,k} a_{i,j,k} f([C/I]_{i,j,k}) \quad (4)$$

The formulae 3 and 4 are only exemplary. Other forms of the utility function g can be found empirically. In the equations 2, 3 and 4 the index i refers to the slot, the index j refers to the frame, and the index k refers to the base station. When the value of the function g is calculated it is not necessary to take into account all slots of all frames, if for instance certain control data slots in certain frames always are transmitted identically, and if the selection of their contents does not affect the benefits obtained by the system's radio resources.

Of course the utility function can also be defined so that the maximally profitable C/I ratio obtained for the packets corresponds to the minimum value of the utility function, and not to its maximum value. The sake of simplicity this patent application treats only the maximum value and maximisation, when reference is made to such search of a utility function extreme value which corresponds to a maximally advantageous C/I ratio obtained for the packets.

The invention does impose any restrictions on the definition of the utility function, but the object is that the definition of the utility function can be used as a competition means between operators. With the selection of the utility function an operator can have an influence on i.a. whether the optimisation algorithm tries to guarantee a C/I ratio on substantially the same level for as many connections as possible, or at least a C/I ratio not equalling zero for all connections (typically a utility function of the product form of the type of equation 4), or whether it tries to maximise the C/I ratio of the most valuable packets (typically a utility function of the sum form of the type of equation 3). The definition of the utility function can also vary dynamically in the same manner as presented above regarding the number of those cells and frames of which the radio resource knapsack is formed: for instance during times of traffic congestion there is used a utility function of a different form than during lighter traffic periods. The utility function can also vary according to the variation of the proportional shares of different traffic types and according to the congestion times separately observed for different types of traffic. The utility function can use simplified models to represent the attenuation on the radio path and other such factors affecting the optimisation, which are difficult or impossible to describe analytically.

In the calculation of the utility function it is also possible to take into account some conditions, which aim at treating different bearers approximately in the same manner. In certain cases it is namely possible that the importance value of the packets of one or some bearers is comparatively high compared with the packets of other bearers, and that there are so many of these packets with a high importance value in the transmission buffer that they could fill up a substantial part of a frame. Then the maximum value of the utility function would be obtained by packing only these packets with a high importance value into the radio resource knapsack, whereby other bearers would not get any service. In order to prevent such a concentration of the data communication capacity there can be defined a certain maximum number of packets which relate to a certain bearer and which can be packed into the radio resource knapsack. Another possibility in the utility function calculation is that only a certain maximum number of packets relating to one bearer is taken into account, whereby the optimisation algorithm limits the number of packets relating to one bearer: when the maximum number is achieved the adding of important packets does not anymore increase the value of the utility function, whereby the algorithm tries to select such other packets which as selected still would increase the value of the utility function. A third alternative in the calculation of the utility function is to take into account a penalty term, which decreases the value of the utility function and which has a magnitude depending on how many packets belonging to the same bearer are placed in the radio resource knapsack. The maximum number of packets from one bearer which may be packed into the same radio resource knapsack, or the maximum number of packets from one bearer which still is taken into account in calculating the value of the utility function, can be defined per bearer, and it can for instance depend on the ratio between the number of packets related to said bearer waiting in the transmission buffer and the number of packets relating to said bearer, which successfully were transmitted during the last frames.

As there is only a limited number of alternatives in the radio resource knapsack to place each packet one method to find the maximum value of the utility function is to try all possible placements of the packets and to select out of these that alternative, which gives the highest value of the utility function. However, substantially more effective methods are known for optimising a function, such as the conjugate gradient method, to which reference is made below, particularly in connection with finding the optimal transmit powers, as well as some further developed dynamic optimisation methods.

Next is described in more detail a preferred method to find the optimal packing order of the radio resource knapsack. First one must decide which rule is applied to such two packets which are placed into simultaneous slots, i.e. into the same slot in two different frames. One advantageous rule is that a certain considered packet is placed in a certain slot only if the C/I ratio calculated after the placement both for the considered packet and for the packets placed already earlier into the simultaneous slots is higher than a certain threshold selected by the operator, whereby the threshold can have different values depending i.a. on the importance value of the packet. If we consider the placement of a certain packet into a frame with several slots, which fulfil the above mentioned rule, then the packet is placed into that slot where its placement results in the largest increase of the value calculated for the utility function over the currently filled slots. In this connection it is advantageous to apply the upper and lower bounds so that if the value of the C/I ratio calculated for a certain packet in a certain slot is higher than a certain upper bound, then the power used to transmit the packet is adjusted to a lower level so that the value of the C/I ratio calculated for it would correspond to the upper bound, and if the value of the C/I ratio calculated for a certain packet in a certain slot is lower than a certain lower bound, then it will not be transmitted at all in said slot.

Figure 4A:
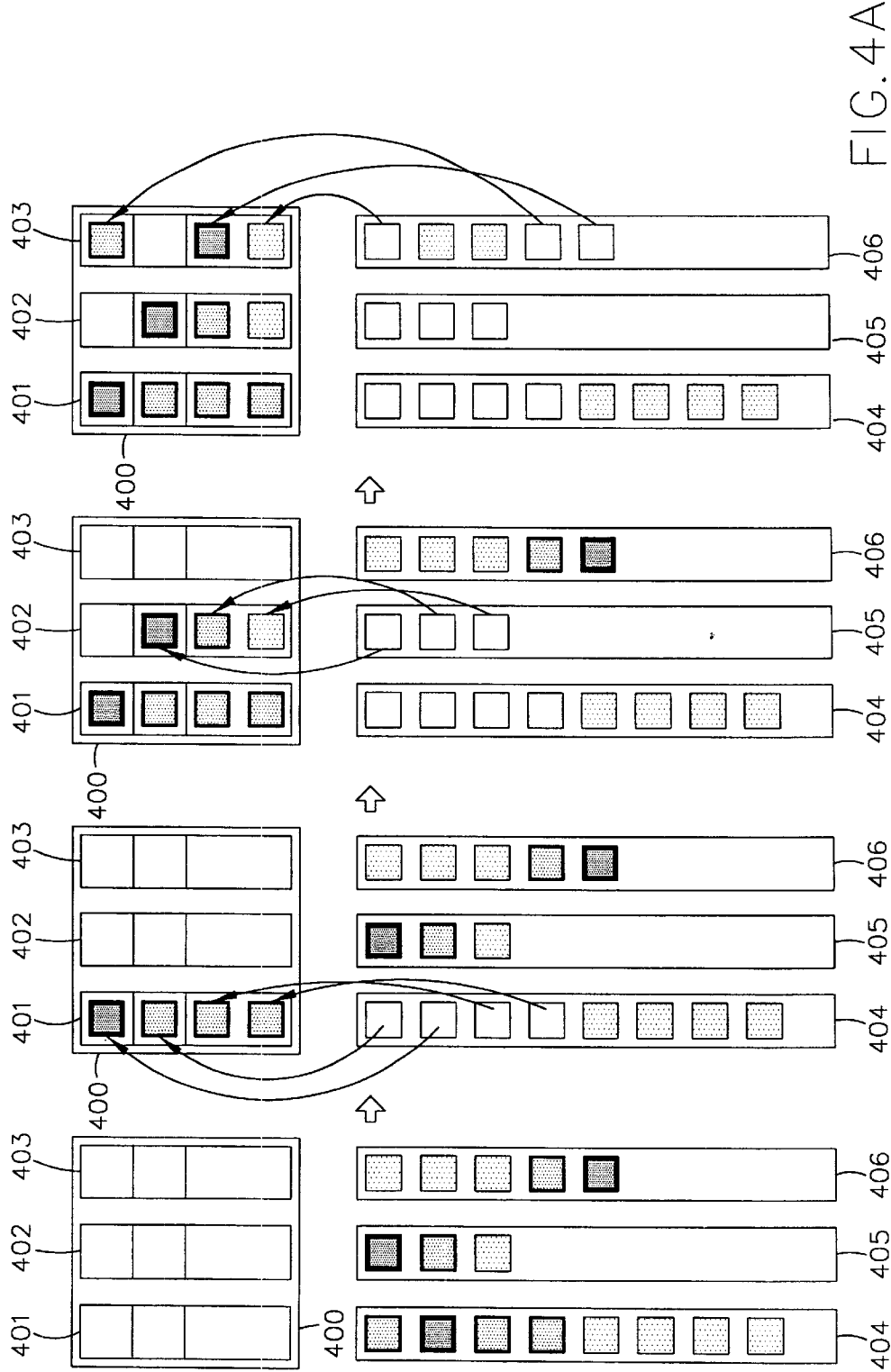
FIG. 4a shows a method to pack a radio resource knapsack.

FIG. 4a shows a simple radio resource knapsack 400, which contains three TDMA frames 401, 402 and 403, which each contain four slots. As distinct from the above presentation the frames are presented in a vertical position for the sake of clarity, whereby in the figure the vertical dimension of each frame represents the time as slots and the horizontal dimension represents the time as frames. In order to find the optimal packing order of the radio resource knapsack the process proceeds from one frame to another in some order. Each base station (or terminal, if the terminal is regarded as the transmitting device) has a number of transmission buffers, which contain the packets to be transmitted and information about their importance value. Generally each bearer has its own transmission buffer, but in order to simplify the figure only the buffers 404, 405 or 406 of the so called considered packets for each frame belonging to the radio resource knapsack are shown in FIG. 4a. Thus this buffer contains from the transmission buffer of each bearer that packet which is the next to be transmitted. To have a transmission buffer for each bearer is a simple means with which it is made sure that the mutual order of the packets relating to a certain bearer does not change, as the most common data communication protocols do not permit a change in the mutual order of the packets between the transmitter and the receiver. Thus the optimisation algorithm can only select the first packet from the transmission buffer relating to a bearer, in other words the next packet to be transmitted. In order to select a suitable packet the optimisation algorithm compares the first packets in the transmission buffers with each other.

The information regarding the packets in the transmission buffers and their importance values must also be known to the device optimising the packing of the radio resource knapsack. In FIG. 4a the importance values are shown by the widths of the packet border lines in the same way as in FIG. 2 above. According to one embodiment a certain first frame 401 is first totally filled by selecting first packets in its transmission buffers in the order of packet importance and taking the most important packet first, which is shown by the arrows. A frame is filled by finding always the best slot for the considered packet. When the first frame has been filled, the action proceeds to fill the next frame 402 observing the above mentioned rule concerning the conditions according to which a packet can be placed into a slot in a certain second frame, taking into account that there already is a packet in the corresponding simultaneous slot of the first frame.

In FIG. 4a it is assumed that a packet with the highest importance value found in the buffer 405 of the corresponding considered packets is first placed into the second frame 402, and during this placement it is found that a simultaneous transmission of this packet and the packet in the first slot of the frame 401 would drop the C/I ratio calculated for one of the packets below said threshold. The most important packet is placed in that remaining slot of the frame where the C/I ratios calculated for it and for the simultaneous packet in the first frame 401 are higher than the threshold value, and if there are several of such slots, the placement is made into that slot where its placement result in the largest increase of the value of the utility function g calculated over the slots filled this far. When two more packets have been placed into the second frame 402 according to the same principles, it will be found that there are no more packets in the buffer 405, so it is possible to continue by filling a third frame. The filling of the frames is continued according to the same principle until all frames of the radio resource knapsack 400 are filled, or until there is not found any such first packets in the transmission buffers corresponding to the incomplete frames which could be placed without violating the rule concerning the filling of simultaneous slots. In FIG. 4a it is assumed that even if there are packets left in the buffer 406, none of them can be placed in the frame 403. When the next radio resource knapsack is packed it is advantageous to change the filling order of the frames, i.e. to select another frame as the first frame.

Figure 4B:
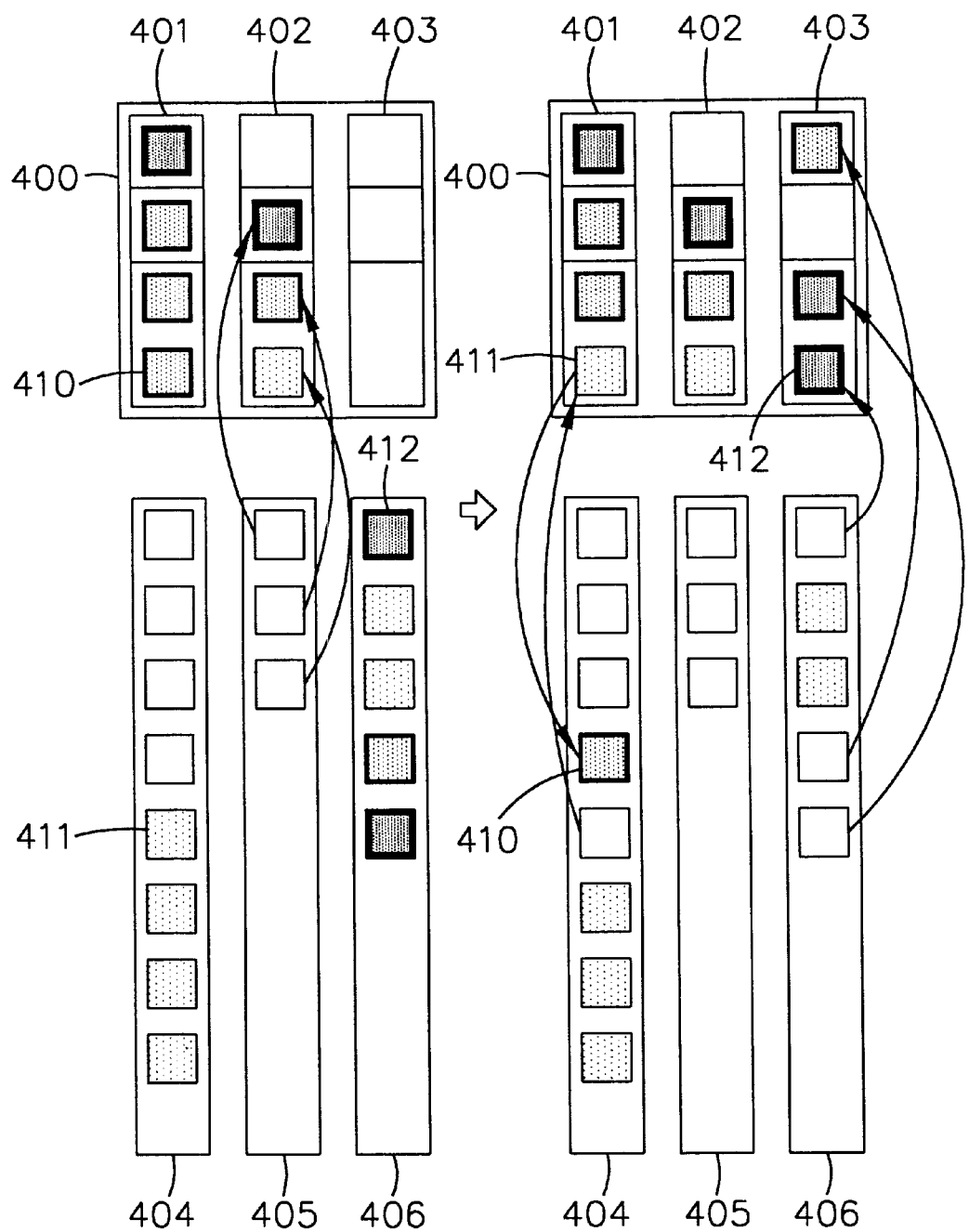
FIG. 4b shows another method to pack a radio resource knapsack.

FIG. 4b illustrates a situation where it is noted during the filling of the third frame 403 belonging to the radio resource knapsack 400 that the packet 412 found in buffer 406 and having an importance value of the first (the most important) importance category is not suited to be transmitted together with any of the packets already placed into the first frame, but all C/I values of the packets already packed into the first frame would drop below the threshold value if the packet 412 would be transmitted simultaneously with them. Regarding the maximising of the utility function the packet would be best suited to be transmitted together with the packet 410 belonging to the second importance category. Applying the systematic reasoning described below it is considered whether the packet 410 already placed into the first frame 401 could be replaced by another packet found in the buffer 404 so that the value of the utility function would be maximised. It is noted that the maximum value of the utility function is obtained with an arrangement where said packet 412 with the highest importance value is placed in the third frame and simultaneously with it the packet 411 is placed into the first frame, whereby the importance value of the packet 411 is lower than the importance value of the packet 410 removed from the first frame.

Figure 5:
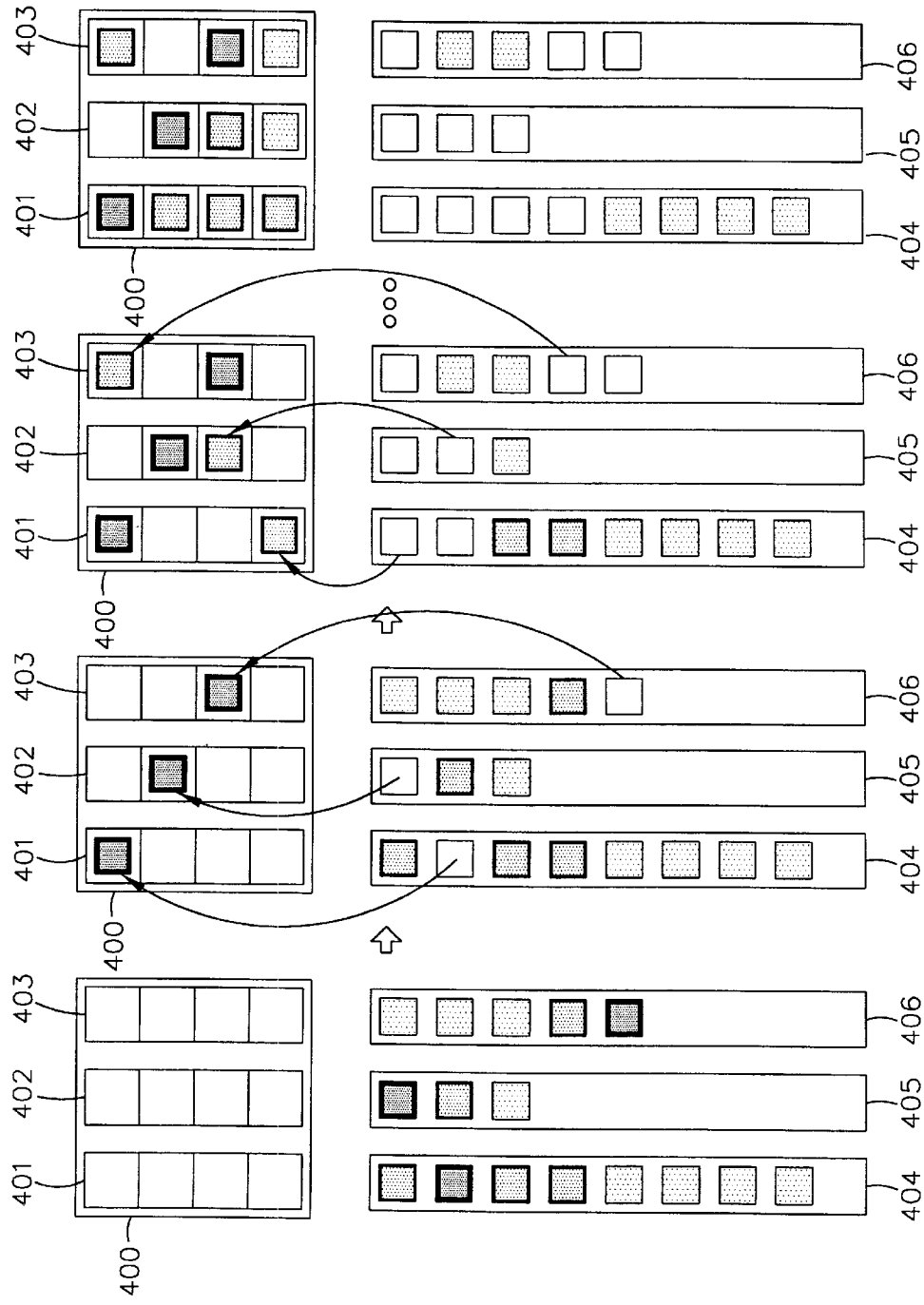
FIG. 5 shows a third method to pack a radio resource knapsack.

In the embodiment shown in FIG. 5 the packet with the highest importance value among the considered packets in the buffer 404 corresponding to the first frame 401 is first placed into the first frame, and then the packet with the highest importance value among the considered packets in the buffer 405 corresponding to the second frame 402 is placed into the second frame, and so on, until there is one packet in each frame. Then the packet with next highest importance value among the considered packets in the buffer 404 corresponding to the first frame is placed into the first frame, and then the packet with the next highest importance value among the considered packets in the buffer 405 corresponding to the second frame 402 is placed into the second frame, and so on, until all frames have been filled, or until there are no packets anymore in any of the transmission buffers which could be placed into a frame corresponding to the transmission buffer by following the rule concerning the filling of simultaneous slots. The placement performed according to this embodiment can lead to the same result as the method according to the previous embodiment, or to a different result; in this embodiment an aim is to fill more evenly the different frames in the radio resource knapsack. In addition to these two alternative embodiments there can be presented intermediate forms of them, for instance the placement of the two most important packets at one time into each frame, before continuing with the next frame.

The different multiple access methods present their own special requirements on the optimisation of the packing of the radio resource knapsack. In the TDMA system it is advantageous to use a dynamic optimisation method, where one frame of the radio resource knapsack is considered at a time, then from the transmission buffers corresponding to this frame is selected the first packet in its own transmission buffer which is not yet placed and which has the highest importance value, and then the aim is to find the slot best suited for it. The aim is to fill the considered frame before continuing to consider the next frame of the radio resource knapsack, and a considered frame is left incomplete only if there is not found such a first packet corresponding to the frame which could be placed into a free slot in the frame without violating the rule concerning the placement of packets into simultaneous slots. If it is not possible to find a suitable slot for the packet not yet placed, or the so called most important packet in the transmission buffers corresponding to the considered frame, then one of the following alternative actions is selected:

a) The most important packet is placed into a slot of the considered frame, despite the fact that a packet already placed into a simultaneous slot in at least one other frame will change to a not suitable packet, or the C/I value calculated for it will drop below the threshold value. Those packets of the other frames which changed into not suitable packets are replaced by packets with lower importance values found in the transmission buffers corresponding to them, so that all simultaneous packets will obtain a value of the C/I ratio which exceeds the threshold value.

b) The most important packet is placed into a slot of the considered frame, despite the fact that a packet already placed into a simultaneous slot in at least one other frame will change to a not suitable packet. Those packets of the other frames which turned into not suitable packets are left as such. This alternative is used if it provides a higher value of the utility function than the alternative a).

c) The most important packet is not placed into any of the slots of the considered frame, but it is tried to place that packet from the same transmission buffer which has the next highest importance value. This alternative is used if it provides a higher value of the utility function than the alternatives a) or b).

If it is necessary to place a packet according to the alternative a) or b) into a slot despite the fact that the value of the C/I ratio calculated for this packet or any other packet drops below the threshold value, then it is possible to consider whether it is profitable to place a copy of the packet left below the threshold value into another slot in the same frame or (if possible) in another frame of the same radio resource knapsack. This is advantageously done before the next packet is taken for consideration. When the receiving device has been signalled that two or more copies of the same packet will arrive, the receiving device can receive all copies even with a low C/I ratio and try to reconstruct the contents of the packet by using the redundant information which it obtained in the copies.

Figure 6A:
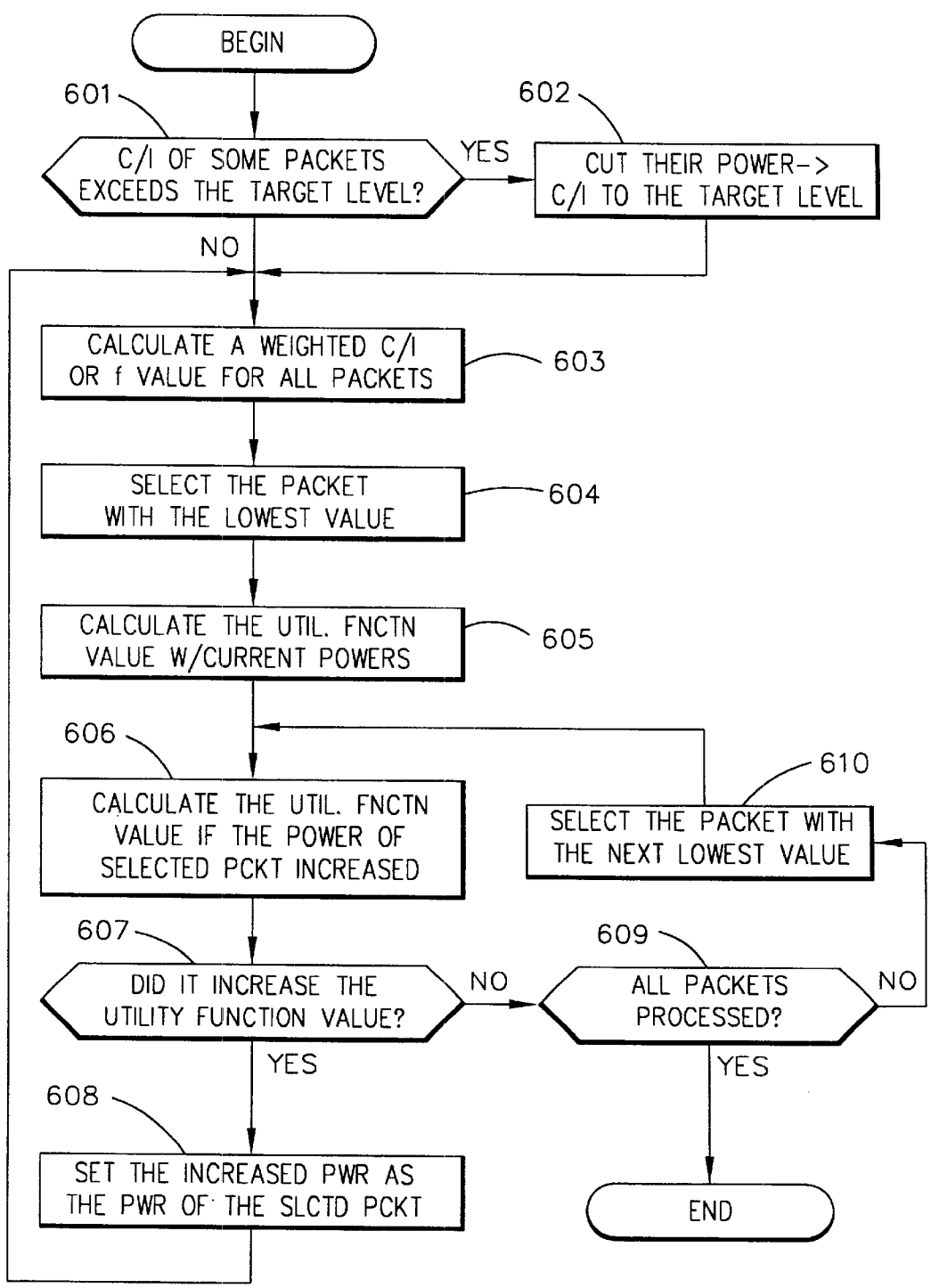
FIG. 6A shows in the form of a flow diagram, the method described above with reference to FIGS. 4a and 4b.
Figure 6B:
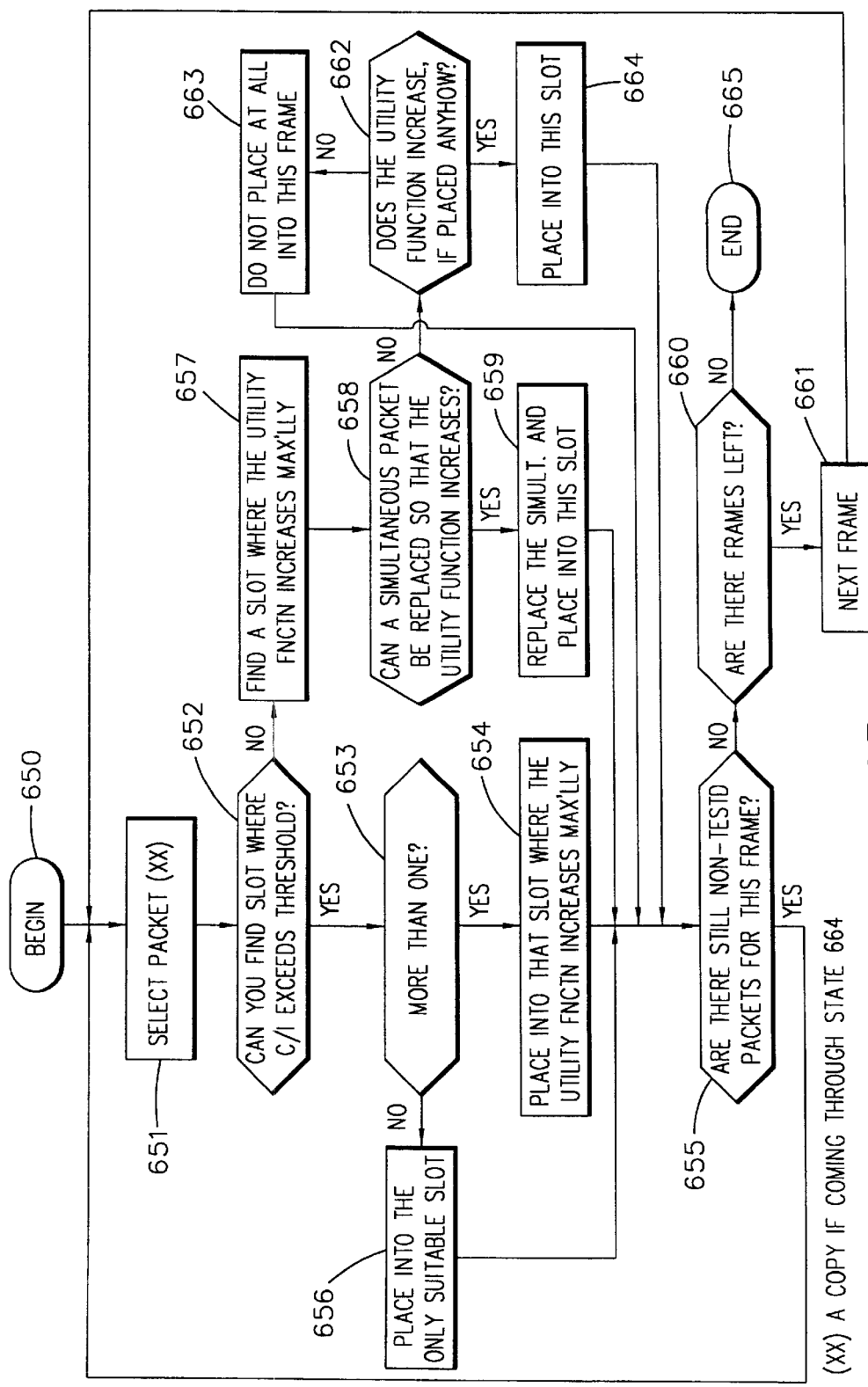
FIG. 6B shows a method for collecting packets within slots of the current frame.

FIG. 6b shows in the form of a flow diagram the method described above with reference to the FIGS. 4a and 4b. The initial state 650 means that the packing of a new radio resource knapsack is initiated. In state 651 is selected the most important packet belonging to a certain frame, which packet is not yet placed, and which has not been tried to place. The easiest possible path passes through the states 652, 653, 656 and 655, whereby the packet is placed into that single slot where it does not decrease the C/I values of other simultaneous packets below the threshold. If a number of suitable slots are found in state 653, the values of the utility function for the different slots are calculated in state 654, and of these is selected that slot where the value of the utility function has the largest increase. However, in state 652 it may be noted that no suitable slot is found. Then according to state 657 that slot of the not suitable slots is found for which the value of the utility function would have the largest increase, and according to state 658 it is tried to replace other simultaneous packets which already have been placed (cf. FIG. 4b). A successful replacing of a simultaneous packet means a shift from to the state 655 via the state 659, but if there is found no suitable packet in state 658, it is possible to perform a test in state 662 whether the value of the utility function increases even if the considered packet is placed anyway. A negative decision means according to state 633 that the considered packet can not be placed into the frame at all, whereby the process returns to the beginning in order to select a new packet. A positive decision means according to the state 664 that the packet is placed in said slot, relying on that the simultaneous packets with a C/I value below the threshold anyhow can provide some advantage to the receiving devices. If the process returned to the state 651, or to the selection of a new packet from the state 664 (via the state 655 and possibly via the states 660 and 661), then there is selected a copy of the last placed packet or a copy of another packet to be transmitted simultaneously with it and with a C/I value below the threshold is selected. When all frames are processed the process is terminated in state 665 regarding this radio resource knapsack.

The special features of the CDMA system are caused by the fact that all packets of the same frame are simultaneous, or they cause mutual interference, whereby the most essential compatibility and incompatibility considerations are made within the frame and not between frames. Even a single frame can be used as a radio resource knapsack, particularly if there is negligible overlapping between the cells. In such cases the packets are placed into the frames from a transmission buffer corresponding to the frame, in an order according to the importance values and the packet with the highest importance value first. In connection with the placement it is possible to select the transmit powers immediately, either by determining the optimal transmit powers of the packets up to this moment always after the placement of one packet, whereby the determination is made in a way which is described in more detail below, or by any known method known per se. The manner with which the optimal packing order of the radio resource knapsack is found will not depend on the method, with which the transmit powers are selected, but when the powers have been selected with any method, it is always possible to find the optimal packing order taking into account these powers. The best result is obtained by optimising both the packing order and the selection of the transmit powers with the method according to the invention based on maximising the utility function.

The placement is continued until it is noted for a certain packet to be placed that there can not be found any transmit powers with which the values of the C/I ratio calculated for all packets, which were placed up to this moment (the last packet included), can exceed the threshold value. Then the last packet is called an unsuitable packet, and then the examination is directed to those yet not placed packets in the transmission buffer for which the determined threshold of the C/I ratio is lower than the threshold of the C/I ratio of the unsuitable packet. As the packets were placed the whole time into the frame in an order determined by the importance values, it not profitable to replace an unsuitable packet by any single packet, because the importance value of the replacing packet is inevitably lower. Instead it is worthwhile to try to replace an unsuitable packet by such at least two other packets, which, taking into account their importance values, increase the value of the utility function calculated over the frame in a higher degree than the unsuitable packet alone would do. The filling of the frame is terminated when there are no more packets which were not yet placed in the transmission buffer, or when the placement of new packets does not anymore increase the value of the utility function calculated over the frame.

As all cells in the CDMA system have the same frequency, there is achieved a substantial advantage in cells overlapping each other wholly or partially as well as at the border areas of cells touching each other, when frames from more base stations are taken into the radio resource knapsack. Then the above described method is applied for the packing of the first frame, and then the next frame of the radio resource knapsack is packed in the same way, but taking into account the effect of the packing into the already packed frames of the radio resource knapsack. If it is noted at the packing of a certain considered frame that the placement of a certain packet causes the value of any of the C/I ratios to drop below the threshold value in the same frame or in any of the already fully packet frames, then there is applied the method which was described above regarding the TDMA embodiment's alternatives a), b) and c).

Here it must be observed that the threshold value of the C/I ratio concerning the fact, whether certain packets can be placed into simultaneous slots, is not the same as the prior art target level of the C/I ratio, with which it is considered certain that the packet reaches its destination. The threshold value of the CII ratio can be lower than the target level known in prior art. When a certain packet has a very low importance value it can, due to the function of the optimisation algorithm, get into a slot where the obtained C/I ratio is so much below the target level that the reception of the packet is virtually impossible in one operation. However, due to the ARQ practice the receiving device stores also those versions which at the reception contained errors, and then it uses all versions of the received packet to reconstruct its content, whereby it may happen that when it has received the packet a few times it can reconstruct it correctly disregarding the fact that the C/I ratio calculated for each single transmission was considerably below the target level. Thus a packet, which was defined to have a low importance value, will reach its destination with a delay corresponding to the retransmissions. However, at the same time it was possible to transmit more important packets with a shorter delay in slots, which were more favourable regarding the C/I ratio, so that the use of the radio resources can be considered to meet the object which was aimed at by giving such importance values.

An alternative method to find the optimal packing order of a radio resource knapsack comprising down-link frames is described below. In this method all packets to be transmitted are divided into so called tolerance categories according to which simultaneous transmissions from other base stations the packet can tolerate so that the value of the C/I ratio calculated for it will not drop below a certain threshold value. In the tolerance category examination it is assumed that the base stations transmit with a constant power, although this would not be true in practice. Thus for instance the highest allowed transmit power can be selected as said constant power. As an example we can think of a situation where the radio resource knapsack comprises down-link frames of three base stations. The first tolerance category comprises those packets from the base station 1, which do not tolerate a simultaneous transmission from any other base station. The second and the third tolerance category correspondingly comprise those packets from the second and third base stations, which do not tolerate other simultaneous packets. A fourth tolerance category comprise those packets from the base station 1, which tolerate a simultaneous transmission only from the base station 2, and those packets from the base station 2, which tolerate a simultaneous transmission only from the base station 1. A fifth and a sixth tolerance category is correspondingly defined to relate to the packets of the base stations 1 and 3 and the packets of the base stations 2 and 3. A seventh tolerance category comprises those packets, which are transmitted from any base station and tolerate any other transmissions.

Primarily only packets belonging to the same tolerance category are placed into simultaneous slots in the radio resource knapsack. If several possible placement slots are found for a certain packet, then that slot is selected for which the placed packet provides the largest increase of the value of the utility function calculated over the slots filled thus far. If no packet is found, which could be placed in a certain slot, when the packet has a tolerance category equalling the tolerance categories of the packets which already have been placed in the simultaneous slots, then the object is to place in that certain slot a packet having a tolerance category, which as much as possible intersects the tolerance categories of the packets already placed in the simultaneous slots. For instance the fourth and the seventh tolerance categories are intersecting tolerance classes in the example of the previous paragraph.

Next is presented still one method to define the suitability of different packets to simultaneous slots, and to find the optimal packing order of a radio resource knapsack comprising down-link frames. Also in this method there is formed for each down-link packet to be transmitted an estimate of which base stations' simultaneous transmissions it can tolerate without the value of the C/I ratio calculated for it will drop below the tolerance value. Also in this method it is assumed that the base stations transmit with a constant power, even if that would not be true in practice. For each packet there is defined a so called tolerance matrix, which is a square matrix of the size N×N, where N equals the number of simultaneous frames belonging to a radio resource knapsack. On the horizontal row corresponding to the considered packet's own frame the tolerance matrix contains values, which represent the compatibility of the packet with the simultaneous transmission of other frames represented by the vertical columns. Correspondingly the horizontal rows representing the other frames contain values, which represent the compatibility of the simultaneous transmission of the considered packet and a packet of said other frame with the simultaneous transmission of other frames. In the simplest case the matrix values are ones and zeros, of which a one represents compatibility and a zero represents incompatibility, but also other values can be used, such as floating point numbers between zero and one.

A group formed by six base stations is in the following treated as an example case, whereby the radio resource knapsack regarding the group thus contains six simultaneous frames. The tolerance matrix to be defined for each packet is then a square matrix with the size 6×6. Let us particularly consider a packet to be placed into the frame of the second base station, which in the matrix is represented by the second horizontal row. Let us assume that the tolerance matrix is as follows:

|   | 1 | 2 | 3 | 4 | 5 | 6 |
|---|---|---|---|---|---|---|
| 1 | 1 | 1 | 0 | 1 | 0 | 1 |
| 2 | 1 | 1 | 0 | 1 | 0 | 1 |
| 3 | 0 | 1 | 1 | 0 | 0 | 0 |
| 4 | 0 | 1 | 0 | 1 | 0 | 1 |

-continued

|   | 1 | 2 | 3 | 4 | 5 | 6 |
|---|---|---|---|---|---|---|
| 5 | 0 | 0 | 0 | 0 | 1 | 0 |
| 6 | 0 | 1 | 0 | 1 | 0 | 1 |

Because the considered packet must be placed into the second frame we can see on the second horizontal row of the tolerance matrix the preliminary compatibility with the simultaneous packets of other frames. We can see that into a simultaneous slot with the considered second frame packet it is possible to place a packet from the frame 1, 4 or 6 in the most advantageous way, because the second horizontal row contains ones in the first, fourth and sixth column (in addition to the self-evident second column). The zero values on the second horizontal row do not necessarily mean a complete incompatibility, but in a way a recommendation that the packets of the third or fifth frame should no be placed into a slot, which appears at the same time as the considered packet.

In this case the packet of the considered second frame is totally incompatible with the packets of the fifth frame (assuming that the base stations transmit with a constant power), which is seen in the fact that the fifth horizontal row of the tolerance matrix has a zero in the second column. On the other hand the second column of the third horizontal row in the tolerance matrix contains a one, which indicates that despite the zero in the third column of the second horizontal row the packet of the considered second frame can be placed into the simultaneous slot with the packet of the third frame. However, the zero in the third column of said second row indicates that this is not as recommendable as the placement of the packet of the considered second frame into a simultaneous slot with the packet of the first, fourth or sixth frame.

Assume first that the considered packet of the second frame would be placed into a simultaneous slot of the packet of the sixth frame. Then the sixth row of the tolerance matrix shows that in addition to the considered packet of the second frame and the packet of the sixth frame, which was selected to be simultaneously placed, the packet of the fourth frame could still be placed into a simultaneous slot, because the sixth row has a one in the second and sixth columns and in addition in the fourth column. Then it is assumed that instead the considered packet of the second frame is placed into a slot which appears simultaneously with the packet of the first frame. Then the first horizontal row of the tolerance matrix shows that in addition to the packet of the considered second frame and a packet of the first frame, which was selected to be simultaneously placed, the packets of the both the fourth and sixth frames could still be placed into a simultaneous slot, because the first row contains ones in the columns 1, 2, 4 and 6. The last mentioned assumption represents a more favourable placement, because after that placement there will be more possibilities to place the other packets into simultaneous slots.

If the packet of the considered second frame on the above grounds is decided to be placed so that it is simultaneous with a packet of the first frame, and if there would be more equally valued packets in the first frame or in the corresponding transmission buffer, then the most favourable of them must be selected as a pair of the packet of the second frame. This is made by examining now the own tolerance matrix of the considered packet of the first frame, and particularly by comparing its second row with the first row of the tolerance matrix of the considered packet of the second frame. Thus more generally, when we consider the compatibility of a packet in the F:th frame with several available packets of the G:th frame, then we compare the F:th row in the tolerance matrix of the packets of the G:th frame with the G:th row in the tolerance matrix of the considered F:th frame packet. Then we form the union and the section of the one-elements of the rows and select that packet from the G:th (here the first) frame, for which the formed union and section of the one-elements have the least difference. We can for instance assume that there would be presented three packets of the first frame, for which the corresponding tolerance matrices would have second rows which for the first packet is [111010] and for the second packet [110100] and for the third packet [110011]. The first row in the tolerance matrix of the considered packet of the second frame is [110101], so the unions and sections of the one-elements on the rows are as follows:

regarding the first packet of the first frame [111111] and [110000], regarding the second packet of the first frame [110101] and [110100], and regarding the third packet of the first frame [110111] and [110001].

When one calculates the difference of the union and section vectors we get:

regarding the first packet of the first frame [001111], regarding the second packet of the first frame [000001], and regarding the third packet of the first frame [000110], which shows that the difference between the union and the section is least regarding the second packet of the first frame (the difference vector contains least non-zero elements), which means that it is profitable to place the packet of the considered second frame simultaneously with the second packet of the first frame.

Disregarding which of the above presented methods was used to place packets into slots in frames of the radio resource knapsack, it is possible after the placement step to optimise the transmit powers used to transmit all placed packets. Next is discussed how the transmit power is controlled in an optimal way regarding the utilisation of the radio resources in a cellular radio system applying the invention. In the discussion reference is made to FIG. 6.

The power control is based on the maximisation of a utility function of the same type as the above presented placement of packets into frames, but in the power control it is worthwhile to define the utility function at one time for the packets placed in simultaneous slots only, which packets thus will be transmitted simultaneously and cause mutual interference. A utility function is defined for that part of the radio resource knapsack, which contains the simultaneous slots, whereby the value of the utility function depends on the value of the C/I ratio calculated for the packets and possible other factors, such as the importance values of the packets. The utility function can also be the same, which was used to find the optimal placement order of the packets. Also in this case the utility function can be defined so that its minimum is found instead of the maximum, but for the sake of simplicity the search for the extreme value is here described only as a maximisation.

In the first step 601 of the power control it is advantageous to find all those packets, for which the calculated value of the C/I ratio is higher than the target level known in prior art, which corresponds to a rather high probability that the packet reaches its destination. In block 602 the power used to transmit these packets is reduced so much that the value of the C/I ratio calculated for them is exactly as high as the target level, or alternatively so that it exceeds the target level by a small factor of confidence. The so called cutting of too high powers according to the blocks 601 and 602 is not necessary according to the invention, but it can reduce the power consumption and unnecessary interference.

Then the optimisation cycle is initiated by calculating in block 603 the value of the C/I ratio for all simultaneous slots of the considered frames, or the value of a function f dependent of the C/I ratio, whereby the value is weighted with the packet's importance value, and then in block 604 that packet is selected which has the lowest calculated value. The value of the utility function is calculated both in block 605 with the present transmit power, and in block 606 so that the transmit power of the selected packet is increased by a certain parameter according to the operator. If one in block 607 observes that the value of the utility function increases when the power of the selected packet is increased, then in block 608 the increased transmit power is set as the new transmit power for the selected packet. Then the cycle starts from the beginning, or in other words the C/I ratio values are calculated for all packets of the considered simultaneous slots, or the value of the function f dependent on the C/I ratio is calculated and weighted with the importance value of the packet, and such a packet is selected to be the object of the action to increase the transmit power which has the lowest calculated value, and the same cycle is repeated until the increased transmit power of any packet does not anymore increase the value of the utility function, whereby the optimal transmit powers have been found and the power control for these packets is finished. If it is found in lock 607 that an increased transmit power for the selected packet will not increase the value of the utility function, then according to the blocks 609 and 610 the operation shifts to consider that packet, which has the next lower value calculated in block 603.

The optimisation according to FIG. 6 is performed in the radio resource knapsack for all simultaneous slots, where mutually interfering packets have been placed. In the control of the transmit power it must by observed that the specifications of the system naturally impose certain maximum and minimum limits on the transmit powers both of the base stations and of the terminals, so if the optimisation gives a result which is outside these limits, then it must be replaced by a corresponding limit value.

Instead of the above presented trial method the control of the transmit power can also be made by a calculation method based on optimisation theory, where the variables are the transmit power values of packets placed in simultaneous slots, and where the utility function to be maximised is a function which is dependent on the C/I ratios calculated for the packets on the basis of the transmit powers and the distance attenuation. A method which is suitable to find the extreme value of a multivariable function is the so called conjugate gradient method, which however requires a very high calculation capacity if there is a large radio resource knapsack to be optimised. Another variant of the above presented power control method is that the C/I ratio used as the determination basis is replaced for instance by the signal-to-noise ratio, by the estimated bit error rate (BER) or frame error rate (FER), or by any other factor representing the quality of the radio connection. Also in the calculations regarding the power control it is possible to use the top and bottom cutters for the C/I ratio (or another corresponding factor) in the same way as was presented above.

The invention does not require that the placements into slots of the packets in the radio resource knapsack, and the transmit power control of the transmitted packets should be separate processes, but they can also be performed simultaneously. For instance in a situation where the placement of a certain packet into a certain slot would give the packet a C/I ratio which is well over the target level, then the transmit power of said packet can be reduced at the same time. The whole calculation cycle for the optimisation of the transmit powers can be made after each single packet has been placed, or always when the K:th packet has been placed, whereby the integer K>1, but the more often the transmit power optimisation is performed, the more extensive calculation requirements it will cause.

The invention does not impose any limitations on whether the packets placed into the slots represent services which require real time or non-real time connections, even though the delays caused by the optimisation algorithm and traffic variations in the transmission of packets can vary, which in the realisation of real time services causes more troubles than in non-real time services. The invention is also suitable for the optimisation of a radio resource knapsack containing both up-link and down-link frames, even though a radio resource knapsack containing up-link frames must be so long in time that the information concerning the packing of the next knapsack can be transmitted as signalling between the terminals and the stationary parts of the network during the transmission and reception of the packets in the previous knapsack.

The optimisation method according to the invention can for some bearers lead to a result that regarding the total system profit there is no use to transmit the packets relating to said bearer, whereby said bearer is dropped, or the connection between the base station and the terminal is cut off. This situation can occur for instance when a certain terminal is disadvantageously located (it receives much interference) and the packets relating to its bearer do not have high importance values. Dropping could be compared to a situation in which, regarding the total system profit, there is no use to form a certain new bearer. However, due to the invention the selection of a bearer which will be dropped and the rejection of a new bearer occurs on well-founded basis and not arbitrarily, as in the prior art systems. The purposeless dropping of connections can be reduced for instance so that the packets, which relate to a bearer with which the packets could not be transmitted without errors during a long time, will be given a higher importance value than before, whereby the optimisation algorithm tries to place them into slots where it is more certain that they reach their destination.

In the following we discuss the signalling which the invention requires between a terminal and the base station, and between the base station and the base station controller or some other device performing the optimisation. The terminal must transmit to the base station the measuring data which describes the attenuation between the terminal and the base station, and the information about the packets in the up-link transmission buffer. To the terminal the base station transmits information regarding the allocation of the slots, so that the terminal can receive the down-link transmission in the correct slot of the down-link frame and transmit the up-link transmission in the correct slot of the up-link frame. To the base station controller the base station transmits information about the packets in the transmission buffer and the data about the measured and calculated carrier power values and interference power values. Further the base station can transmit to the base station controller information about the restrictions on the transmit power concerning each terminal and base station. The base station controller can also detect the instantaneous loading situation in the cell.

The base station controller or another device performing the optimisation keeps a table of the radio connections between the terminals and the base stations regarding the radio connections' mutual interdependencies and their relations causing interference, in other words how different transmit powers and attenuation factors appear in each connection.

If one assumes that the base station controller is responsible for the realisation of the optimisation algorithm, then the base station controller must have the required calculation and memory capacity, which comprises microprocessors and memory circuits and/or mass storage devices known per se. The means to realise the signalling between the base stations and the base station controller are known per se in prior art cellular radio systems, and the invention requires only functional changes to them: the base station signalling means must be programmed to transmit to the base station controller information about the packets to be transmitted and their importance values, and the signalling means of the base station controller must be programmed to transmit this information to that part of the base station controller, which contains memory means for storing the information transmitted by the base stations and at least one microprocessor for process'g this information. The optimisation algorithm is stored in the program memory in the form of instructions which are suitable to be processed by the microprocessor, whereby the program memory is available to the microprocessor performing the optimisation. The packet transmission order obtained as the result of the optimisation is temporarily stored in the memory of the base station controller, from which the corresponding data can be transmitted to the base stations with the aid of the signalling means. Further the signalling means known per se between the base stations and the terminals transmit to each terminal information about in which slots the down-link packets will be transmitted which are intended to be received by the terminal in question, and in which slots of the up-link frames the terminal in question can transmit. If the optimisation is realised in another device than the base station controller, then the means mentioned in connection with the base station controller must of course be located in said other means.

A modification of the presented invention is the selection of the transmitting base station in cellular radio system, where a certain packet can be transmitted to a terminal either through a first base station or through a second base station, or both through the first and second base stations. The last mentioned alternative or macro diversity comes into question mainly in systems applying CDMA, where the terminal's receiver is arranged to receive many multipath components of the same signal and to use at least those two multipath components with the highest power to reconstruct the original message. If both alternative base stations (or all alternative base stations, if there are more than two base stations) belong to the same group regarding the use of the radio resources, or their transmission frames belong to the same radio resource knapsack, then the optimisation algorithm can calculate separately all cases, in which the transmitted packet is placed either in only one frame or simultaneously in at least two frames, and select from these alternatives that one which is the most profitable regarding the maximising of the utility function.

What is claimed is:

1. A method for generating a mutual transmission order for a multitude of packets to be transmitted in a radio system, in which radio system at least part of the data to be transmitted is formed into packets for the transmission, and which radio system comprises at least two transmitting devices, which are arranged to transmit carrier power to receiving devices substantially simultaneously on substantially the same frequency band so that the carrier power transmitted by the first transmitting device is interference power to those receiving devices, to which the second device transmits carrier power, and vice versa, said method comprising the steps of generating a first utility function having a value that depends on the carrier power and the interference power that are obtained by calculation for the packets to be transmitted in their certain mutual transmitting order, and arranging the packets to be transmitted in a mutual transmission order that corresponds to an extreme value of said first utility function.

2. A method according to claim 1, wherein the mutual arrangement of the packets is performed per frame, whereby the radio resource knapsack that will contain the packet on the basis of which the value of the first utility function is calculated, comprises at least one frame for the first transmitting device and at least one frame for the second transmitting device.

3. A method according to claim 2, wherein the number of frames contained in said radio resource knapsack is dynamically changing.

4. A method according to claim 1, characterised in that further a tolerance matrix is formed for at least one packet intended to be transmitted by the first device, whereby this matrix describes which simultaneous transmission of other transmitting devices said packet can tolerate, and the packets to be transmitted are arranged in a mutual order where said packet is arranged to be transmitted simultaneously with those other packets transmitted by other transmitting devices, the simultaneous transmission of which said packet can tolerate according to the tolerance matrix.

5. A method for generating a mutual transmission order for a multitude of packets to be transmitted in a radio system, in which radio system at least part of the data to be transmitted is formed into packets for the transmission, and in which radio system a certain transmitting device is arranged to transmit carrier power to at least two receiving devices substantially simultaneously and on substantially the same frequency band so that the carrier power transmitted by the transmitting device to the first receiving device is interference power to the second receiving device, and vice versa, said method comprising the steps of generating a first utility function having a value that depends on a value representing the quality of the radio connection that is obtained by calculation for the transmitted packets in their certain mutual transmitting order, and arranging the packets to be transmitted in a mutual transmission order corresponding to an extreme value of said first utility function.

6. A method according to claim 5, further comprising, in order to generate said first utility function, the substeps of generating a first function with a value that depends on a quality value representing the quality of a radio connection, said quality value being obtainable by calculation, and generating a second function with a value that depends on the values of the first function calculated for the packets to be transmitted, whereby said second function is said first utility function.

7. A method according to claim 6, wherein said quality value is one of the following: the C/I ratio, the S/N ratio, the S/(I+N) ratio.

8. A method according to claim 6, wherein said first utility function has a form which is one of the following: the sum of the quality values; the product of the quality values.

9. A method according to claim 5, wherein the value of said first utility function further depends on certain importance values of the packets, whereby said importance values indicate the mutual order of importance of the packets.

10. A method according to claim 9, wherein the importance value of a certain packet is determined on the basis of at least one of the following facts: the quality of service observed on that radio connection to which the packet relates; the pricing on the radio connection to which the packet relates; the delay, which occurred in transmitting the packet.

11. A method according to claim 5, wherein said first utility function's dependence on said value representing the quality of the radio connection that is obtained by calculation comprises a restriction, according to which values representing the quality of the radio connection that are higher than a certain maximum value are replaced by said maximum value.

12. A method according to claim 5, wherein said first utility function's dependence on said value representing the quality of the radio connection that is obtained by calculation comprises a restriction, according to which values representing the quality of the radio connection that are lower than a certain minimum value are replaced by said minimum value.

13. A method according to claim 5, wherein the form of said first utility function is chosen on the basis of the loading situation of the radio system.

14. A method according to claim 5, further comprising the substeps of
dividing the packets to be transmitted into tolerance categories, and
arranging the packets to be transmitted into a mutual order, in which at least two packets belonging to the same tolerance category are arranged to be transmitted simultaneously.

15. A method for selecting the transmit powers for the transmission of packets to be transmitted in a radio system, in which radio system at least part of the data to be transmitted is formed into packets for the transmission, and which radio system comprises at least two transmitting devices arranged to transmit carrier power to receiving devices substantially simultaneously and on substantially the same frequency band, whereby the carrier power transmitted by the first transmitting device is interference power to those receiving devices, to which the second device transmits carrier power, and vice versa, the method comprising the steps of
generating a second utility function, the value of which depends on the carrier power and the interference power which are obtained by calculation for the packets arranged to be transmitted simultaneously, and
selecting, for the packets to be transmitted simultaneously, such transmit powers which correspond to an extreme value of said second utility function.

16. A method according to claim 15, wherein said second utility function is the same as a first utility function used for selecting the optimal mutual transmission order for the packets to be transmitted, calculated however only over the packets arranged to be transmitted simultaneously.

17. A method according to claim 16 wherein, when the packets to be transmitted are arranged in a mutual transmission order, the calculation of the value of said second utility function and the selection of the transmit powers on the basis of this utility function is performed always when K new packets have been placed to be transmitted simultaneously with some other packet, which was placed previously into a radio resource knapsack, whereby the integer K>1.

18. A method according to claim 16 wherein, when the packets to be transmitted are arranged in a mutual transmission order, the calculation of the value of said second utility function and the selection of the transmit powers on the basis of this utility function is performed when all packets to be transmitted mutually simultaneously have been selected.

19. A radio system comprising base stations and terminals, in which radio system the base stations and the terminals are arranged to form at least part of the data to be transmitted into packets for the transmission, and which radio system comprises at least two transmitting devices arranged to transmit carrier power to receiving devices substantially simultaneously on substantially the same frequency, whereby the carrier power transmitted by the first transmitting device is interference power to those receiving devices, to which the second device transmits carrier power, and vice versa, the radio system comprising means for
calculating the value of such a first utility function, the value of which depends on the carrier power and the interference power obtainable by calculation for the transmitted packets in their current mutual transmission order at that moment,
giving instructions to the transmitting devices to arrange the packets in such a mutual transmission order which corresponds to an extreme value of said first utility function, and
giving instructions to the receiving devices to receive the packets in such an order, in which the transmitting devices arrange the packets to be transmitted.

20. A radio system comprising base stations and terminals, in which radio system the base stations and the terminals are arranged to form the transmitted data into packets for the transmission and to select the transmit power for each packet to be transmitted, and in which radio system there are at least two transmitting devices arranged to transmit carrier power to receiving devices substantially simultaneously on the substantially same frequency, whereby the carrier power transmitted by the first transmitting device is interference power to those receiving devices, to which the second device transmits carrier power, and vice versa, the radio system comprising means for
calculating the value of such a second utility function, the value of which function depends on the carrier power and the interference power obtainable by calculation for the simultaneously transmitted packets, and
giving instructions to the transmitting devices to select such transmit powers for the packets, which powers correspond to the extreme value of said second utility function.

21. A radio system according to claim 20, further comprising a base station controller, whereby the means to calculate the value of the first utility function and the means to give instructions to the transmitting devices are located in said base station controller.

* * * * *